May 2, 1939.  A. B. SNIDER  2,156,550
OCEAN WAVE DYNAMO
Filed July 25, 1936  4 Sheets—Sheet 1
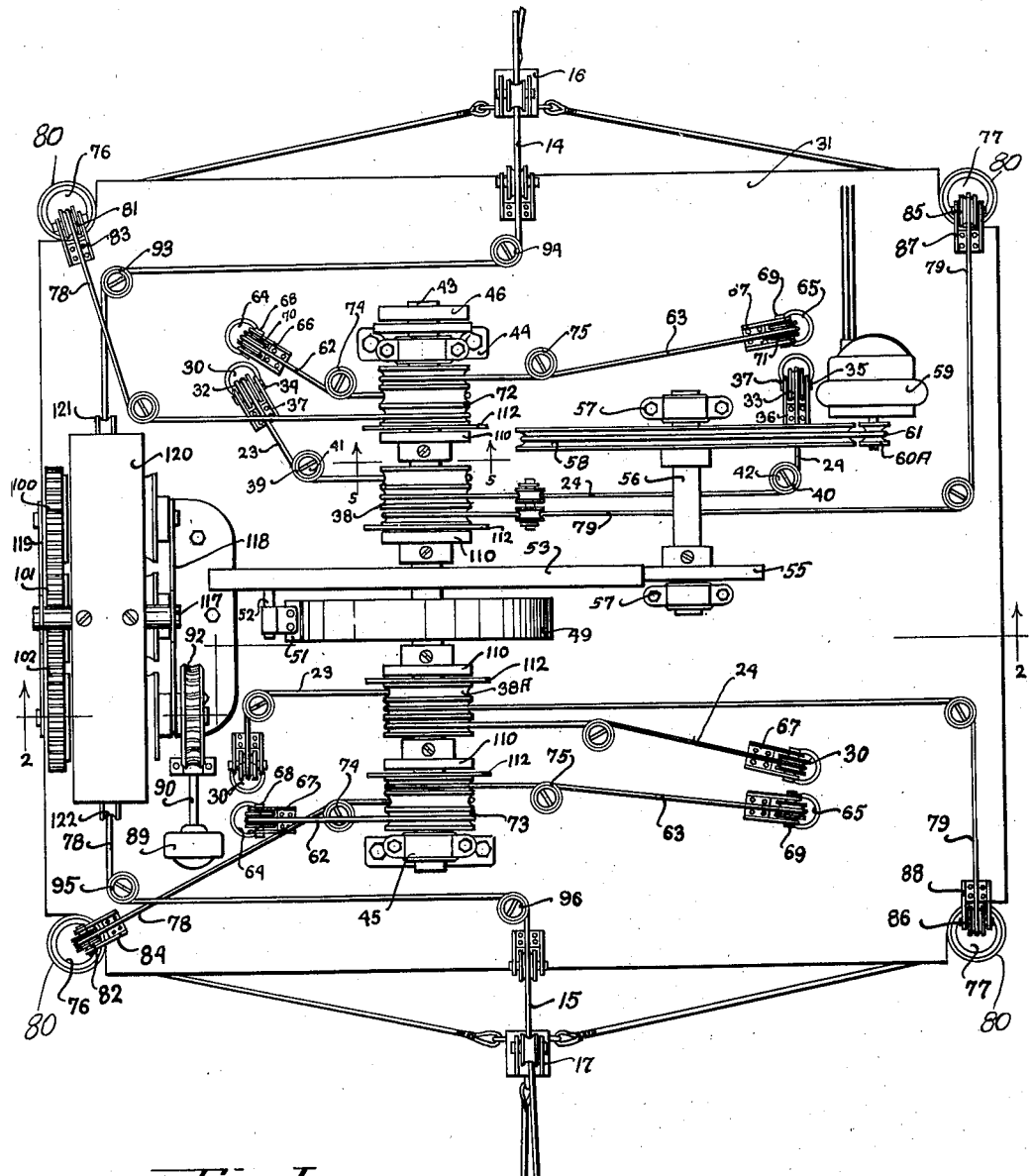
Fig. I
Inventor
Asa B. Snider
By Thomas Bilyeu
Attorney

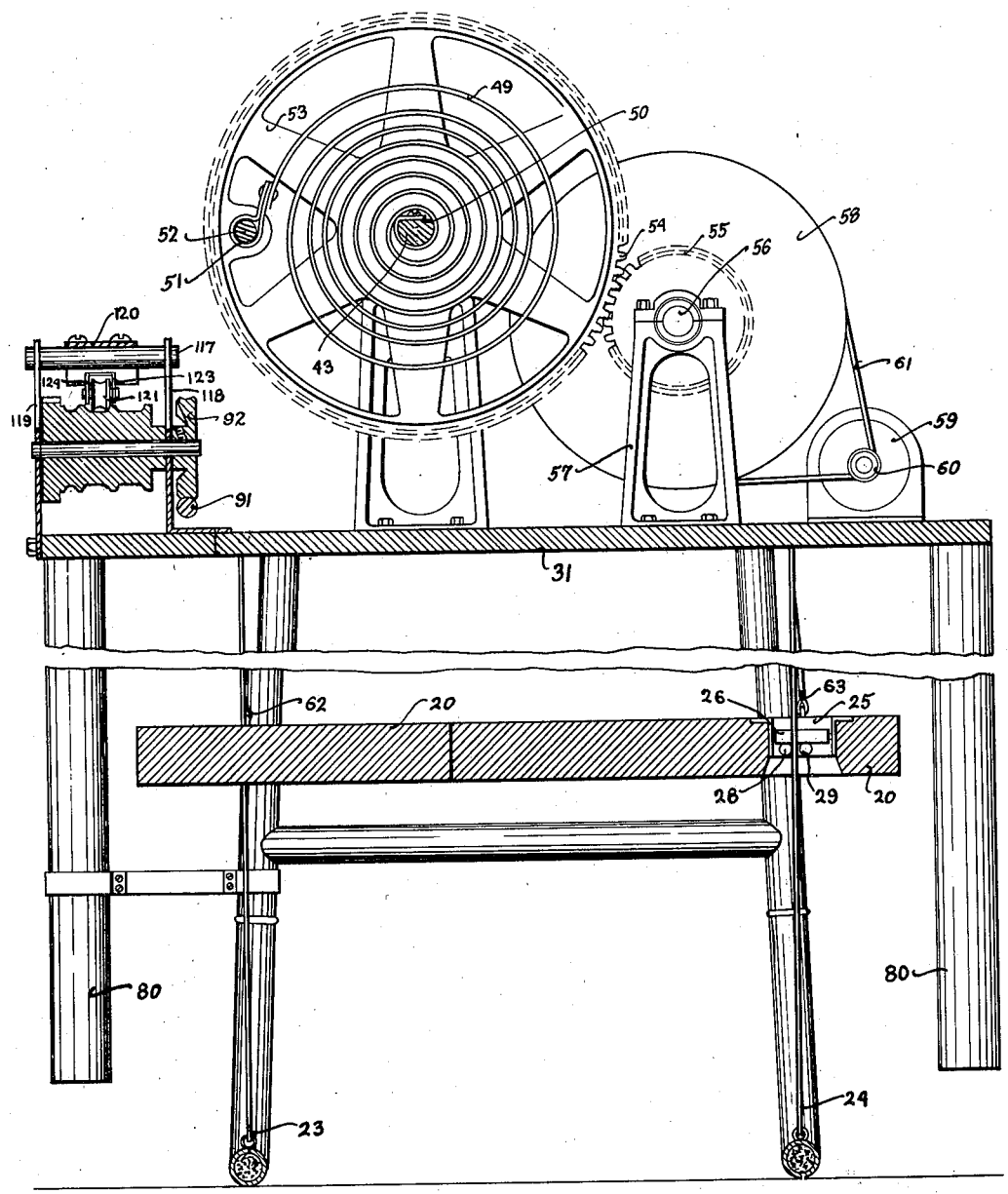

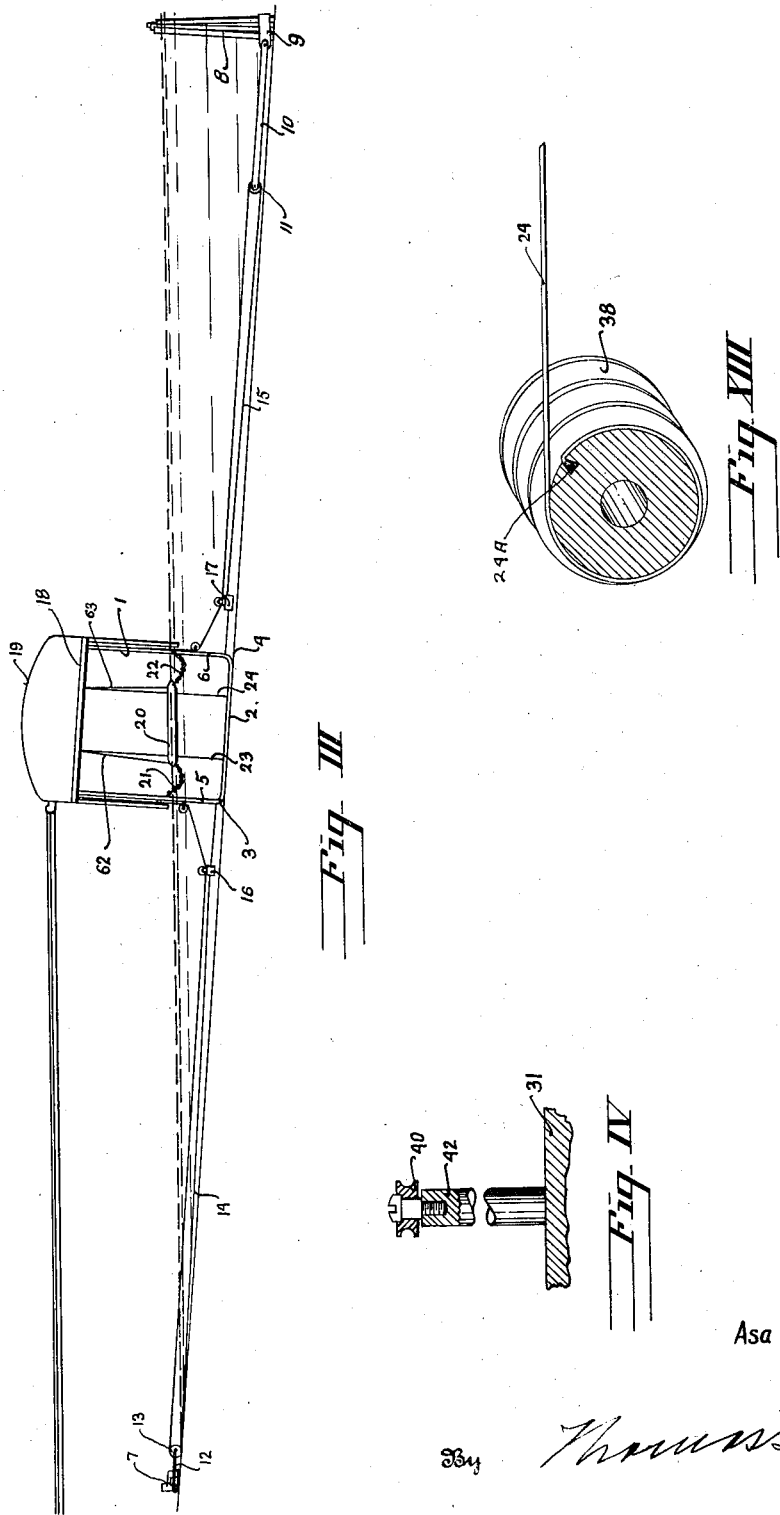

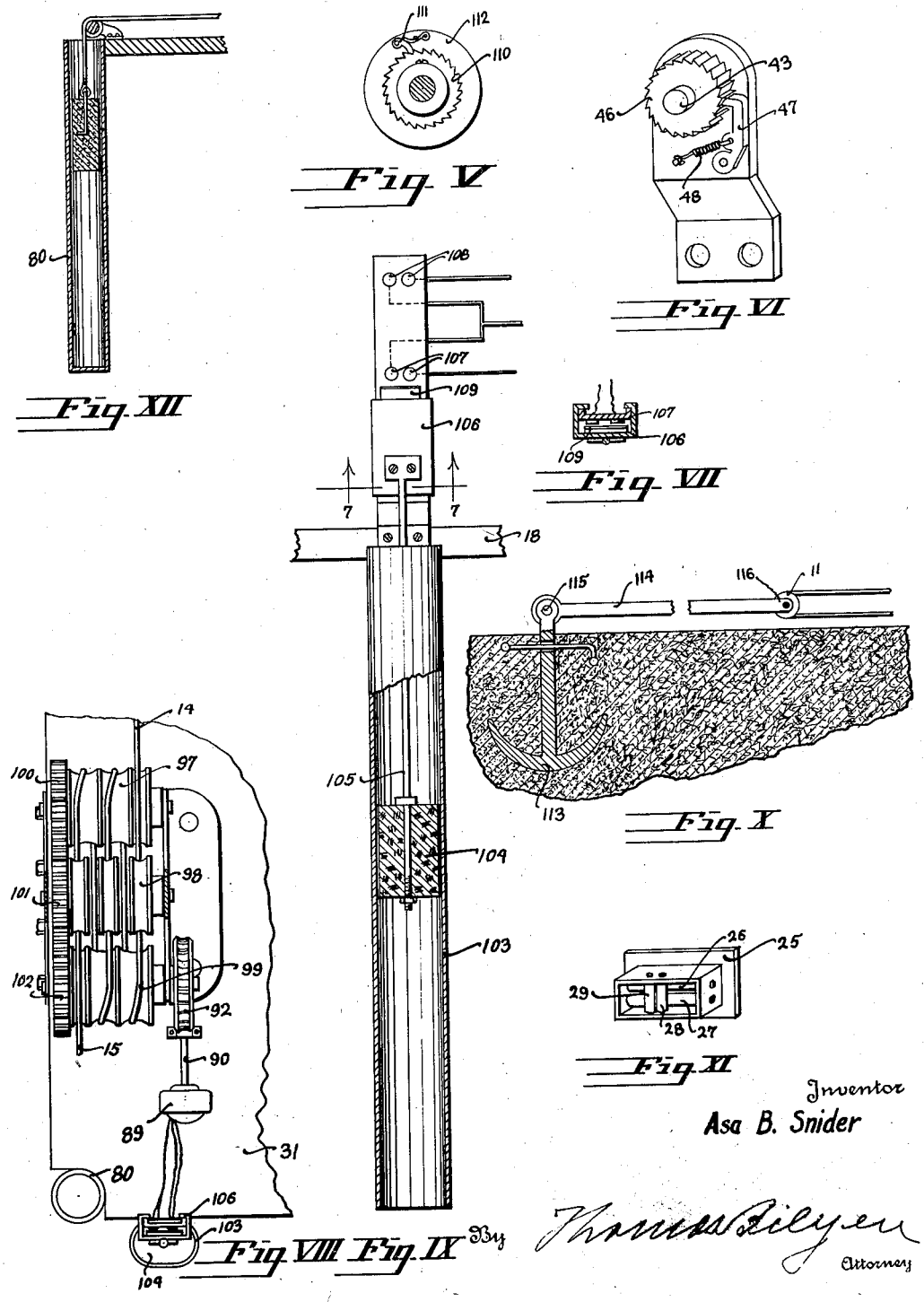

Patented May 2, 1939

2,156,550

UNITED STATES PATENT OFFICE 2,156,550

OCEAN WAVE DYNAMO

Asa B. Snider, Portland, Oreg.

Application July 25, 1936, Serial No. 92,574

4 Claims. (Cl. 253—4)

My invention relates to improvements in a structure for supporting an ocean wave dynamo. The primary purpose and object of my invention is to provide a device that will automatically position itself in a predetermined depth of water for supporting an instrumentality to generate electric energy from the wave action at the seashore.

It is not the primary purpose and object of my invention to develop power from the rise and fall of the tide but it is the primary object of my invention to support and maintain a device to develop electric energy through wave action.

My invention is composed of a framed structure upon which is mounted instrumentalities for converting the action of the waves into electric energy.

I provide a fixed anchor off shore and hinge an arm to the fixed anchor and provide means for raising and lowering the arm when required. One or more pulleys are disposed in the free end of the arm around which a cable is trained. The cable leads to the framed structure and a plurality of drums are disposed upon the frame structure around which the cable is trained and the cable then leads to a fixed support upon the shore. An automatic actuated winding mechanism is provided for drawing the framed structure toward and away from the shore within a predetermined path in order that the framed structure and the instrumentalities associated therewith may be positioned within a predetermined depth of water which will automatically position the framed structure so that the wave action may be taken advantage of to the maximum.

A power shaft is journaled upon the top of the framed structure. A driving gear is mounted upon the shaft and a plurality of clutches are mounted upon the shaft and at either side of the frame. The driving gear is full floating upon the shaft and a spring or other cushion is secured to the shaft upon one of its ends and to the gear upon its other end in order that full flexibility may be developed and in order that a cushioning effect may be maintained between the gear and the shaft. A float is suspended within the frame and below the top deck or platform and the float is suspended by winding cables that are secured to the clutches and upon each descending of the float, rotation is imported to the driving gear to thereby generate power upon each receding of the wave that raises the float. A power generator, as a dynamo, is driven by the driving gear and electric energy developed by the dynamo may be directly used or stored in a storage battery.

The primary purpose and object of my invention is to provide a simply constructed device that may be used as a support to maintain thereupon devices to be used in the generating of electric energy at each movement of the wave coming in contact with the float suspended within the frame of the device.

A further object of my invention consists in providing automatic means for positioning the device within a predetermined depth of water.

A further object of my invention consists in so positioning the same that it will be moved within a predetermined path to thereby place the device at its point of greatest usefulness in transforming the action of the waves into useful energy.

A further object of my invention consists in so constructing the device that it will be composed of a minimum number of parts, one that may be installed at the seashore and one that will automatically position itself relative to the waves that develop at different positions relative to the shore at the rise and fall of the tide.

A further object of my invention consists in so constructing the device that it will have a long and useful life with practical freedom from operating mechanical annoyances.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a plan view of the assembled device. In this view the root for the structure upon which the same is mounted is shown removed.

Fig. 2 is a sectional end view of the mechanism illustrated in Fig. 1. This view is taken on line 2—2 of Fig. 1, looking in the direction indicated.

Fig. 3 is a diagrammatical end view of the assembled device shown as being associated with anchors, both off-short and in-shore and the lines associated therewith for moving the device to water of a predetermined depth so that the waves will operate the suspended float at its maximum efficiency.

Fig. 4 is a fragmentary side view, partially in section, of one of the standards upon which a spool is disposed and about which the operating lines are trained.

Fig. 5 is a sectional end view of one of the winding clutches. This view is taken on line 5—5 of Fig. 1, looking in the direction indicated.

Fig. 6 is a perspective end view of a bracket for mounting the pull and ratchet wheel for preventing the unwinding of the power shaft.

Fig. 7 is a sectional end view of a supporting column having an electric contact disposed thereupon. This view is taken on line 7—7 of Fig. 9, looking in the direction indicated.

Fig. 8 is a fragmentary plan view of a portion of the deck and a plan view of the winding drums associated with the haul lines. The purpose of the haul lines being to maintain the assembly at the proper height to take advantage of the greatest wave action occurring along the shore line where the device is installed.

Fig. 9 is a side view, partially in section of a chamber having a float movable therein and which automatically makes and breaks an electric contact to energize the motor for automatically maintaining the assembly in water of a predetermined depth.

Fig. 10 is a sectional view of the earth off-shore illustrating any suitable deadman as an anchor imbedded therein and to which is attached a haul-back arm.

Fig. 11 is a perspective inverted plan view of the block and rollers through which the lines pass for maintaining the suspended float in its proper relationship with the deck to which it is supported.

Fig. 12 is a sectional side view of a weight tube illustrating the weight disposed therein and illustrating the same as being secured to the free end of the winding lines.

Fig. 13 is a perspective, sectional view of one of the winding drums shown removed from the shaft upon which it normally turns. This shows the end of line 24 secured to the drum 24A.

Like reference characters refer to like parts throughout the several views.

I have here shown my device as being comprised of a structural frame 1 having bottom runners 2 and having rounded corners 3 and 4 that connect the bottom runners 2 with upwardly extending legs 5 and 6.

I provide a suitable anchor station 7 inshore and a suitable anchor station 8 off-shore. The respective stations may be made of piling, deadmen, counter-weights, anchors, or any suitable material that is sufficiently strong for locating and withstanding the pulling pressures that are to be applied thereto. On the outside station 8 I provide an anchor band 9 at the base or adjacent the base of the anchor and hinge an arm 10 relative thereto in order that the arm 10 may have a sheave or sheaves 11 disposed in the free end of the same which may be changed, reconditioned or replaced as needed. A bridle 12 is disposed about the anchor 7 and sheaves 13 are disposed therein. Lines 14 and 15 are trained respectively about the sheave blocks 11 and 13. Bridles 16 and 17 are provided at the two-part lines in order that the top one of the same may be led to the deck 18 of the assembly. A suitable cover 19 is provided for maintaining the machinery under roof if desired.

A suspended pontoon float 20 is suspended within the frame and below the deck 18 and pairs of stabilizing chains 21 and 22 are secured upon their one end to the edges of the pontoon 20 and upon their other end to the structural frame in order that the horizontal movement of the pontoon float 20 may be regulated and maintained.

A vertical movement of the pontoon float 20 as well as the horizontal movement of the pontoon float is transformed into useful work by the mechanism hereinafter to be described.

Lines 23 and 24 are secured upon their bottom ends to any suitable fastenings secured to the bottom 2 of the structural frame. Lines 23 and 24 pass through any suitable boxing 25 secured to the float and friction is lessened by passing the respective lines between roller bearings 26 and 27 that extend horizontally through the boxing 25 and between roller bearings 28 and 29 that are disposed vertically within the end of the boxing. A plurality of ports 30 are disposed within the deck 31 through which the lines 23 and 24 pass. Grooved pulleys 32 and 33 are disposed in registry with the respective ports 30 and about which the respective lines 23 and 24 are trained. The grooved pulleys 32 and 33 are mounted upon any suitable stub shafts 34 and 35 and the stub shafts are secured to and are supported upon shaft supporting heads 36 and 37. It will be noted that these shaft supporting heads are in pairs, that I have shown four lines, two associated with each side of the pontoon floats at each side and adjacent the end of the pontoon float. In order that each pair of lines 23 and 24 may be trained about a common grooved winding drum 38 I provide pulleys 39 and 40 in registry with the respective grooves of the winding drums.

The pulleys 39 and 40 are mounted respectively upon vertically disposed shafts 41 and 42 in the larger installations and where the pulleys 39 and 40, or either of them, are spaced from the grooved winding drums 38 and 38A, the respective winding drums 38 and 38A are mounted upon a common power shaft 43. The power shaft 43 is journaled within suitable pillow blocks 44 and 45. In order that the power shaft 43 may be required to rotate in one direction only, I provide a ratchet wheel 46 thereupon. This ratchet wheel is illustrated in detail in Fig. 6 and a pawl 47 is provided for cooperating therewith, to prevent the rerotating of the power shaft 43. A spring 48 maintains the free end of the pawl 47 in intimate contact and in engagement with the ratchet wheel 46.

A cushioning spring 49 is secured upon its one end 50 to the power shaft and upon its opposite end 51 to a wrist pin 52 that is secured to the primary driving gear 53. The gear 53 is free to rotate upon the power shaft 43 and gear teeth 54 are disposed upon the outer surface of the power gear 53. A pinion 55 coacts with the power gear 53 and is driven thereby. The pinion 55 is mounted upon a shaft 56 and as the pinion 55 is rotated the shaft 56 will also be rotated. The shaft 56 is journaled within any suitable shaft supports 57. A pulley 58 made relatively heavy in order that it will act as a fly wheel is also mounted upon the shaft 56 and a dynamo 59 having a driving pulley 60 is disposed adjacent the fly wheel 58 and as the fly wheel is rotated the dynamo shaft 60 will be rotated by training any suitable driving element 61 about the driving pulley 58 and the pulley 60A of the dynamo 59.

The suspended pontoon float 20 is suspended by supporting lines 62 and 63. The pairs of lines 62 and 63 extend through ports 64 and 65 disposed within the deck 31 of the structure. Pulley and shaft supporting heads 66 and 67 are provided. The pulley and shaft supporting heads have shafts 68 and 69 disposed therein and having grooved pulleys 70 and 71 disposed thereupon and about which the respective lines 62 and 63 may be led directly to the grooved winding drums 72 and 73. I provide pulleys 74 and 75 at suitable positions in the line of travel of the respective lines 62 and 63.

As the suspended pontoon float support is raised through the action of the waves any slack developed in the pairs of lines 23 and 24, 62 and 63 will be taken up by counter-weights 76 and 77 that are secured to the lines 78 and 79.

As the waves recede the partially immersed floating pontoon falls and in doing so rotation is imparted to the driving shaft. If a horizontal movement is imparted to the floating pontoon the power shaft will also be rotated.

In order that the counter-weights may be moved in predetermined paths the same move within suitably constructed tubes 80 as illustrated in Fig. 12.

The respective pairs of lines 23 and 24, 62 and 63 are secured respectively upon their oppositely disposed ends to the floats and to the counter-weights.

The pair of counter-weighted lines 78 are secured upon their one end to the respective winding drums 72 and 73 and upon their oppositely disposed ends to the counter-weights 76. The pairs of counter-weighted lines 79 are secured upon their one end to the winding drums 38 and 38A and upon their opposite ends to the counter-weights 77. The pair of counter-weighted lines 78 are trained respectively about grooved pulleys 81 and 82 that are journaled and supported within frames 83 and 84 and the pair of counter-weighted lines 79 are trained about grooved pulleys 85 and 86 that are journaled in suitable frames 87 and 88.

The armature shaft 90 of the electric motor 89 has a worm 91 disposed thereupon and the same coacts with and drives a worm wheel 92. The electric motor is energized by any suitable source of electric energy, as being directly connected to the dynamo 59 or it may be energized from a source of electric energy not here shown, as being energized from a storage battery that may be charged by the electricity developed by the dynamo 59.

The respective pulling lines 14 and 15 are trained about the respective winding drums 93 and 94, 95 and 96 and the respective pulling lines 14 and 15 is comprised of a single line and trained about the respective winding drums 97, 98 and 99 in Fig. 8. In order that the respective winding drums 97, 98 and 99 may work in synchronized relationship with each other, gears 100, 101 and 102 are secured to the respective winding drums or to the shafts upon which the same are fixedly secured and coact with each other.

The purpose of the pulling lines, winding drums and the electric motor 89 is to maintain the assembled instrumentalities for the development of power through the action of the waves in a predetermined depth of the water. This is automatically accomplished by the electric switch illustrated in Fig. 9.

A chamber 103 has a float 104 disposed therein and a piston rod 105 is connected with the float and upwardly extends therefrom and it has an electric contact head 106 associated therewith. Disposed in the normal line of travel of the head 106 are two independent electric terminals 107 and 108. The electric motor 89 is a reversing motor. When contact is made between the electric terminal 109 the electric motor 89 will be run in one direction and the assembled instrumentalities will be moved away from the shore. When the metal plate 109 makes contact with the electric terminal 108 the electric motor 89 will be run in the opposite direction and the assembled instrumentalities will be pulled toward the shore. The position of the float 104 predetermines which of these contacts is being made and in which direction the instrumentalities are moved and whether away from shore or toward the shore. When the tide is going out the water will fall and the electric contact will be made by the contact head to move the assembled instrumentalities away from the shore when the other of the contacts is made due to a rising tide the contacts will be made to rotate the motor in the opposite direction and the assembly will be moved toward the shore.

Thus the position of the structure and of the pontoon will be maintained at the point of greatest wave activity which is predetermined by the depth of water in which the assembled device is positioned and this in turn is predetermined by the tide. When the tide is out the assembled instrumentalities will be moved offshore and as the tide comes in the assembled instrumentalities will be automatically moved toward the shore to maintain the device in substantially the same depth of water irrespective of the location of the same.

Each of the winding drums 38, 38A, 72 and 73 has a ratchet and pawl associated therewith, the ratchet and pawl being illustrated in Fig. 5. The purpose and object of the ratchet and pawl is to prevent the rerotation of the power shaft 43. The respective ratchets and pawls illustrated in Fig. 5, are designated by 110 for the ratchet and 111 for the pawl. The ratchet 110 is directly secured to the power shaft and the respective pawls 111 are secured to the flanged head 112 of the respective winding drums 38, 38A, 72 and 73.

Where an anchor 113 is provided as the deadman for anchoring the pulling lines, the same may be placed as illustrated in Fig. 10. When so made a link 114 is hingedly secured to the anchor 113 by a shaft 115. The oppositely disposed end of the link 114 has a journal pin 116 associated therewith and upon which the sheave or grooved pulley 11 is mounted.

The pulling lines for moving the assembly toward and away from the shore is a single line and it is essential that the line remain taut to maintain the line in frictional pulling engagement with the sheaves about which the same is trained. I accomplish this result by journaling a shaft 117 in the side frames 118 and 119 in which the shafts of the drums 97, 98 and 99 are journaled.

I secure a reactance means as a spring board or a spring made of metal, as illustrated at 120 and secure the same to the shaft 117. Riding pulleys 121 and 122 ride the line passing thereunder and the pulleys 121 and 122 are journaled on the underside of the reactance spring board 120. These brackets are illustrated at 123 and 124. These ride the line and normally maintain the same in taut condition and free of slack.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of a structural frame, said structural frame having a bottom disposed thereunder, with said bottom having up-turned sides with rounded corners disposed therebetween, running lines outwardly extending from opposite sides of the frame, with said lines running about sheaves spaced apart therefrom, and disposed at opposite sides of the frame, with one end of said line being secured to the frame, the intermediate portion of said line being trained about a winding drum, a deck superposed above the bottom and said deck being spaces sufficiently from the bottom to be disposed above maximum wave height, power driven winding drums disposed upon the deck, a wave motor-disposed upon the deck and about which the line is trained and automatic means for energizing the power unit for moving the frame toward and away from the shore line to automatically maintain the frame assembly within water of a predetermined depth.

2. In a device of the class described, the combination of a frame having a runner disposed upon its lower end and a superposed deck, with the deck being spaced above the runner sufficiently to permit the rise and fall of the tide and the waves passing therebetween, an operating line outwardly extending from the opposite sides of the frame, with said line passing through the frame, anchored sheave blocks disposed at the opposite sides of the frame and spaced therefrom, the said line being trained about said sheave blocks and said line being trained about a driving drum with said driving drum being disposed upon the deck of the frame, a reversible electric prime mover associated with the driving drum and connected so as to drive the same, an electric circuit for supplying energy to the prime mover, a wave motor disposed upon the deck and adapted for energizing the prime mover and automatic means for making and breaking the circuit and for energizing the electric prime mover with said automatic circuit control means being adapted for being actuated due to the rise and fall of the tide.

3. In a device of the class described, the combination of a frame, an operating line anchored relative to the frame and outwardly extending from the opposite sides of the frame, anchored sheave blocks disposed at opposite sides of the frame and about which the operating line is trained with the operating line being trained about a winding drum mounted within and supported upon the said frame, a reversible electric prime mover for driving the winding drum, an electric circuit for supplying energy to the electric prime mover, a wave motor disposed upon the frame and automatic means for making and breaking the circuit and for determining the direction of rotation of the electric prime mover to actuate the same to thereby predetermine whether the frame is to be moved toward or away from the shore line.

4. In a device of the class described, the combination of a frame, a pulling line disposed at the opposite sides of the frame, with the pulling line being trained about a drum mounted within the frame, anchors disposed at opposite sides of the frame and spaced therefrom, sheave blocks associated with each of the anchors and said line being trained about the sheave blocks, a deck superposed the frame and supported thereupon, a reversible prime mover, an electric power actuated drum disposed upon the deck and about which the line is trained to provide means for pulling the frame toward and away from the shore line, an electric circuit for supplying energy to the electric power driven winding drum, a wave motor for energizing the electric prime mover, and automatic means for making and breaking the circuit of the prime mover for driving the winding drum and said automatic means predetermining the direction of rotation of the winding drum to thereby predetermine whether the frame is to be moved toward or away from the shore line and for automatically maintaining the frame in water of a predetermined depth.

ASA B. SNIDER.